F. P. FENTRESS.
TWO-SPEED GEARING.
APPLICATION FILED FEB. 20, 1909.
958,797.
Patented May 24, 1910.
2 SHEETS—SHEET 2.
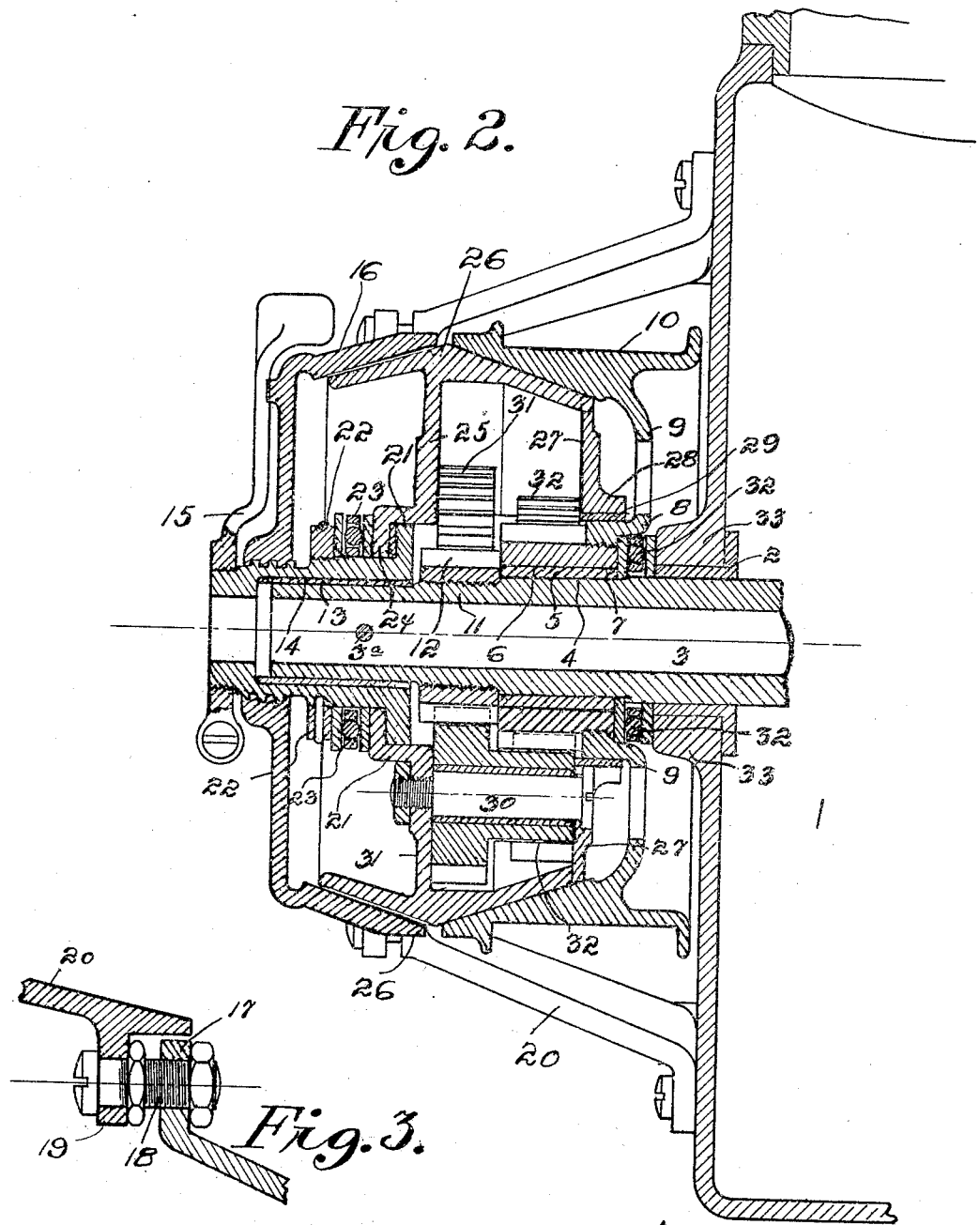
WITNESS:
Frank P. Fentress
INVENTOR
BY
E. E. Vrooman
his ATTORNEY.

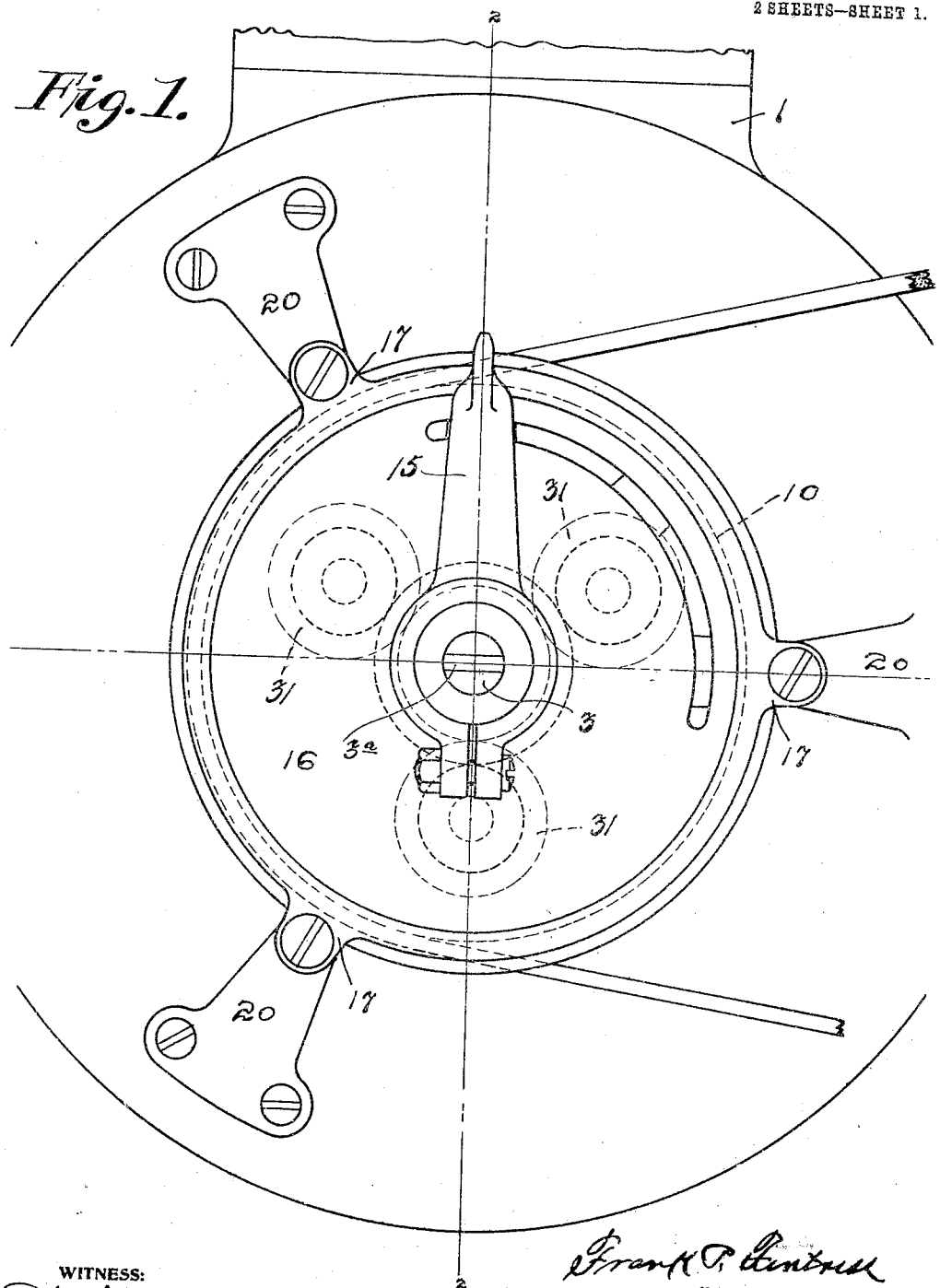

UNITED STATES PATENT OFFICE.

FRANK P. FENTRESS, OF TACOMA, WASHINGTON.

TWO-SPEED GEARING.

958,797.  Specification of Letters Patent.  Patented May 24, 1910.

Application filed February 20, 1909. Serial No. 479,206.

*To all whom it may concern:*

Be it known that I, FRANK P. FENTRESS, a citizen of the United States, residing at Tacoma, in the county of Pierce and State of Washington, have invented certain new and useful Improvements in Two-Speed Gearing, of which the following is a specification, reference being had therein to the accompanying drawing.

This invention relates to variable speed gearing for motor cycles and the like, and the principal object of the invention is to provide a change speed device which may be readily operated without dismounting from the motor cycle.

In carrying out the above and other minor objects of the invention it is contemplated employing coöperating clutching members and gears which are controlled by means of a lever within easy access of the rider so that the same may be readily manipulated either by the hand or foot to increase or decrease the speed of the cycle.

It will be understood that in carrying out the objects of the invention generally stated above, the essential features thereof are susceptible of a wide variation in details and structural arrangements, one practical example of which is shown in the accompanying drawings, wherein—

Figure 1 is a front elevation of the base of an engine cylinder, showing the improved variable speed gearing applied thereto. Fig. 2 is a central vertical sectional view taken on the line 2—2, Fig. 1. Fig. 3 is a detail view, in section, showing the manner of connecting the clutch housing to the engine cylinder base.

Referring to said drawings by numerals, 1 designates the base or crank pit of an engine cylinder, having a bearing 2 in one side for a crank shaft 3, which, beyond said bearing, has a shouldered portion 4 upon which is mounted a bearing cylinder 5 carrying a large gear 6, the teeth of which at one end are cut away to provide a threaded portion 7 which is engaged by a threaded inturned flange base 8 of a web 9 carried by a pulley sprocket wheel, or the like 10. Beyond the shouldered portion 4 of the crank shaft, another, and smaller threaded shoulder 11 is formed for the reception of the threads of a small gear 12. And beyond the last mentioned shoulder 11, the shaft is reduced in diameter and has mounted thereon a bearing cylinder 13 of a sliding sleeve 14 surrounding the reduced end portion of the shaft and projecting beyond the end thereof, and being provided with a reduced threaded extremity for detachable engagement with a threaded end of a controlling lever 15. Said sleeve 14 has a threaded engagement with the side of a brake-ring 16, the outer edges of which are provided with a plurality of attaching ears 17 having a detachable bolt or screw engagement 18 with the angular ends 19 of hanger arms 20 carried by the said crank pit 1.

The inner end of the slidable sleeve 14 terminates in an outstanding annular flange 21 and adjacent to said annular flange 21, the sleeve 14 carries a washer 22 and thrust bearings 23, the said thrust bearings being interposed between the flanged end 24 of a clutch webbing 25 and the said washer 22 of the sleeve 14. The clutch 26, which is of an exterior cone shape has its inner end supported and in rigid engagement with a supporting plate 27 the outturned bottom 28 of which rests upon a bearing cylinder 29 carried by the base 8 of the webbing 9 of the pulley 10.

The supporting plate 27 and the clutch webbing 25 have opposite ends of shafts 30 journaled therein upon each of which a double gear is mounted, the larger gear 31 being adapted to mesh with the gear 12 fast on the shaft 3, and the smaller gear 31 being adapted to mesh with the gear 6 loose on the shaft 3.

Thrust bearings 32 are preferably interposed between the end of the loose gear 6 and the outstanding annular bearing opening 33 formed in the crank-pit for the shaft 3.

The controlling lever 15 may be either in the form of a foot lever or a hand lever, in the latter case it would be extended up adjacent to the saddle of the cycle so as to be within easy reach of the hand of the operator.

The shaft 3 is, preferably, a hollow one, and may be provided with a transversely-extending pin $3^a$ near its outer end with which a starting crank may engage to start the engine.

The operation is as follows: When the lever 15 is pushed forward, the clutch 26 will be forced into frictional engagement with pulley 10 which locks the gearing, and makes a direct drive. When the lever 15 is reversed to the farthest point, clutch 26 will be free from pulley 10 and clutched into brake-ring 16 holding clutch 26 fast and allowing the gears to operate and drive pulley 10 at a less speed than crank shaft 3 according to the relative size of gears engaging. When lever 15 is placed half way between the high and low position then the clutch 26 will be entirely free and run idle in an opposite direction from the engine as there is nothing to hold it, and being engaged to the pulley 10 through the gears it would be compelled to revolve around the cup named. But when clutched to part 16 it will be held fast and compel the pulley 10 to revolve on its axle. From the foregoing, it will be seen that when lever 15 is pushed forward a direct drive or high gear is obtained, and when pushed back at its farthest point the low gear is obtained. And when the lever 15 is at the intermediate point the shaft is free as the gear housing 26 will not be in clutch to any part and, therefore, run idle.

While in the foregoing description and the accompanying sheets of drawing a belt pulley 10 has been shown, it will, of course, be readily understood that a sprocket wheel or the like may be substituted therefor, to permit the use of a chain.

I claim as my invention:—

1. A device of the character described comprising a crank shaft, a fast and a loose gear thereon, a drive gear having a threaded engagement with the loose gear, a clutch member slidably mounted on said shaft, and gear wheels carried by said clutch member and engaged with said fast and loose gears carried by the crank shaft.

2. A device of the character described comprising a crank shaft, a fast and a loose gear thereon, a drive gear carried by the loose gear, a clutch member slidably mounted on the shaft, gear wheels mounted in said clutch member and engaging with the fast and loose gears of the shaft, and a manually operable lever for imparting a sliding movement to said clutch member.

3. A device of the character described comprising a crank shaft, a fast and a loose gear thereon, said gears being of different size, a drive gear carried by the loose gear, a clutch member slidably mounted on said shaft, gears mounted in said clutch member, said gears being of different size, and a manually operable lever for imparting a sliding movement to said clutch member to cause it to engage with the said drive gear.

4. A device of the character described comprising a crank shaft, a fast and a loose gear thereon which are of different size, a pulley carried by the loose gear, a sleeve slidably mounted on said shaft, a clutch member carried by said sleeve, gear wheels mounted in said clutch member, said gears being of different size, and a manually operable lever carried by said sleeve and adapted to move the same to cause the clutch member to engage with the pulley.

5. In a device of the character described, the combination with a support of a shaft carried thereby, speed mechanism on said shaft, hanger arms projecting from said support, each arm having an attaching ear at its outer end, a brake ring, and a detachable connection between said ring and said ears.

In testimony whereof I hereunto affix my signature in presence of two witnesses.

FRANK P. FENTRESS.

Witnesses:
  H. W. LUEDERS,
  L. NEUBAUER.